Figure 1:
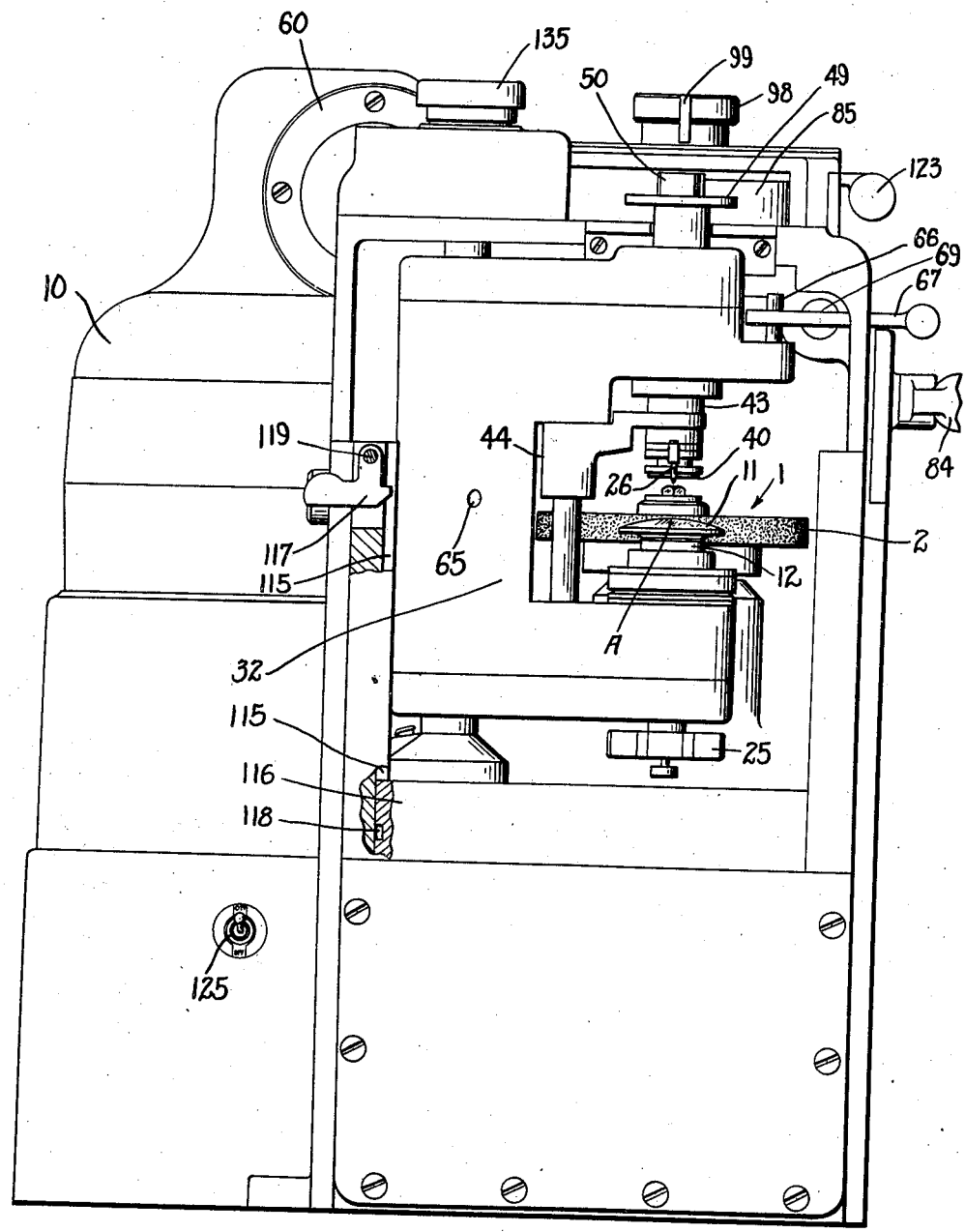

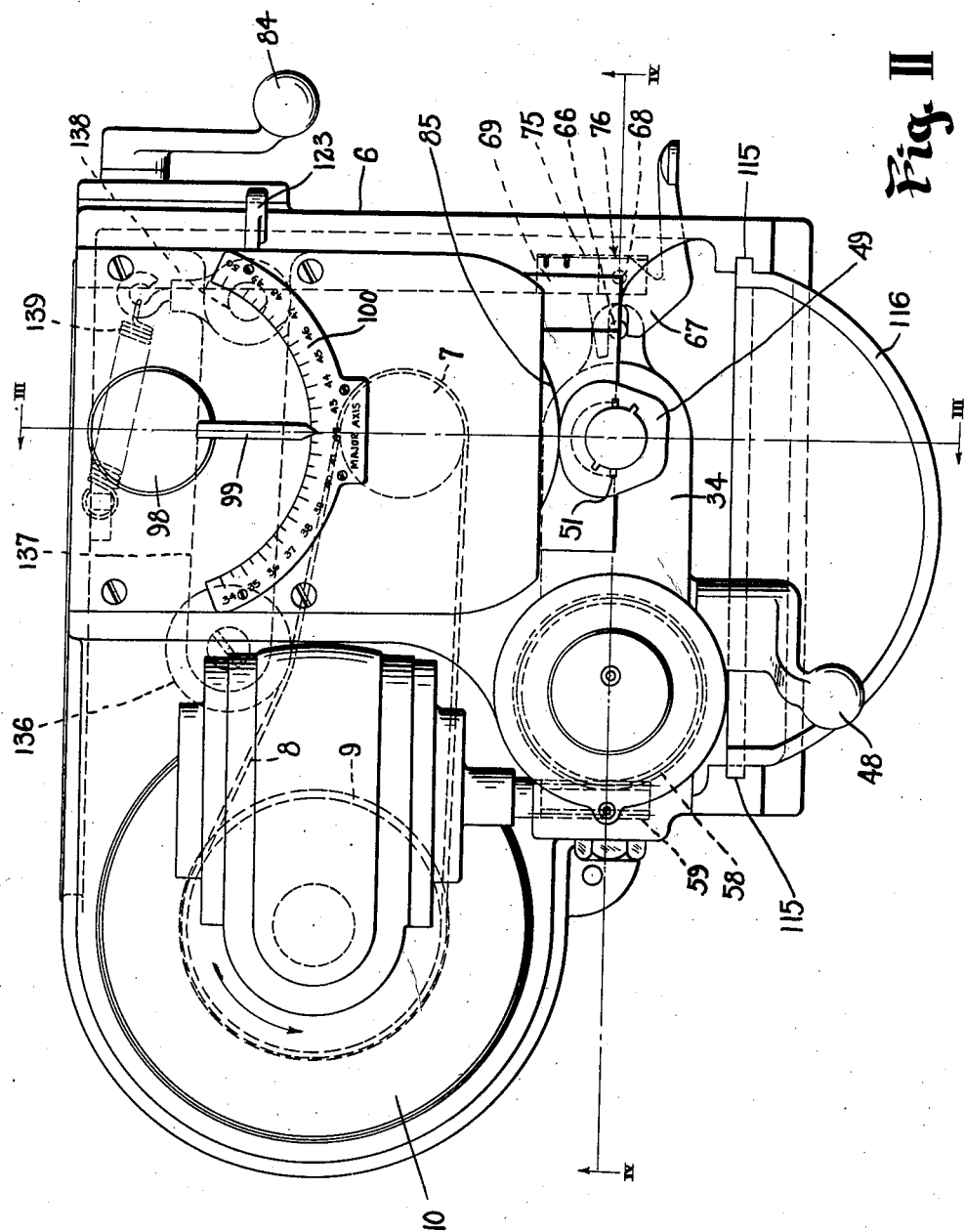

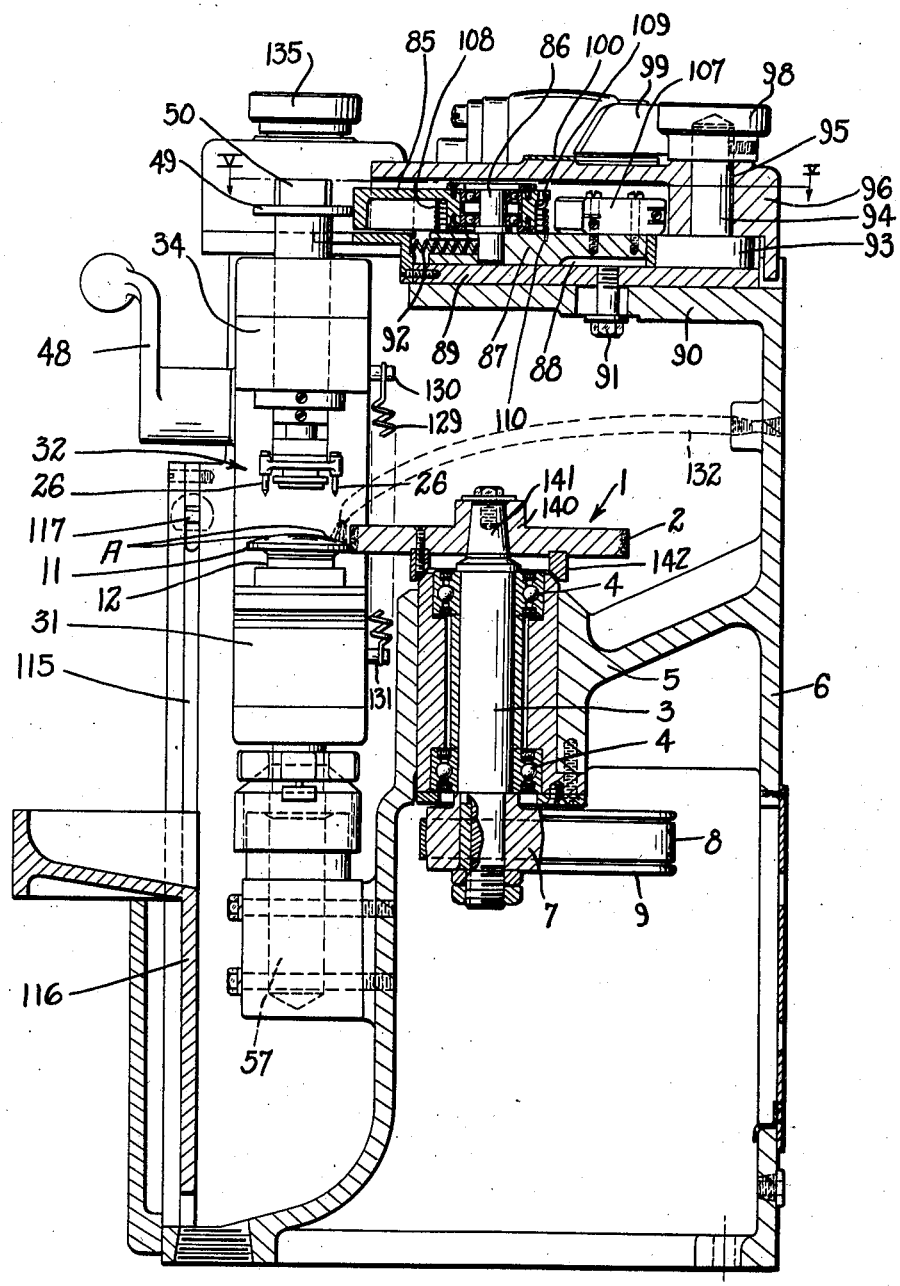
Fig. III

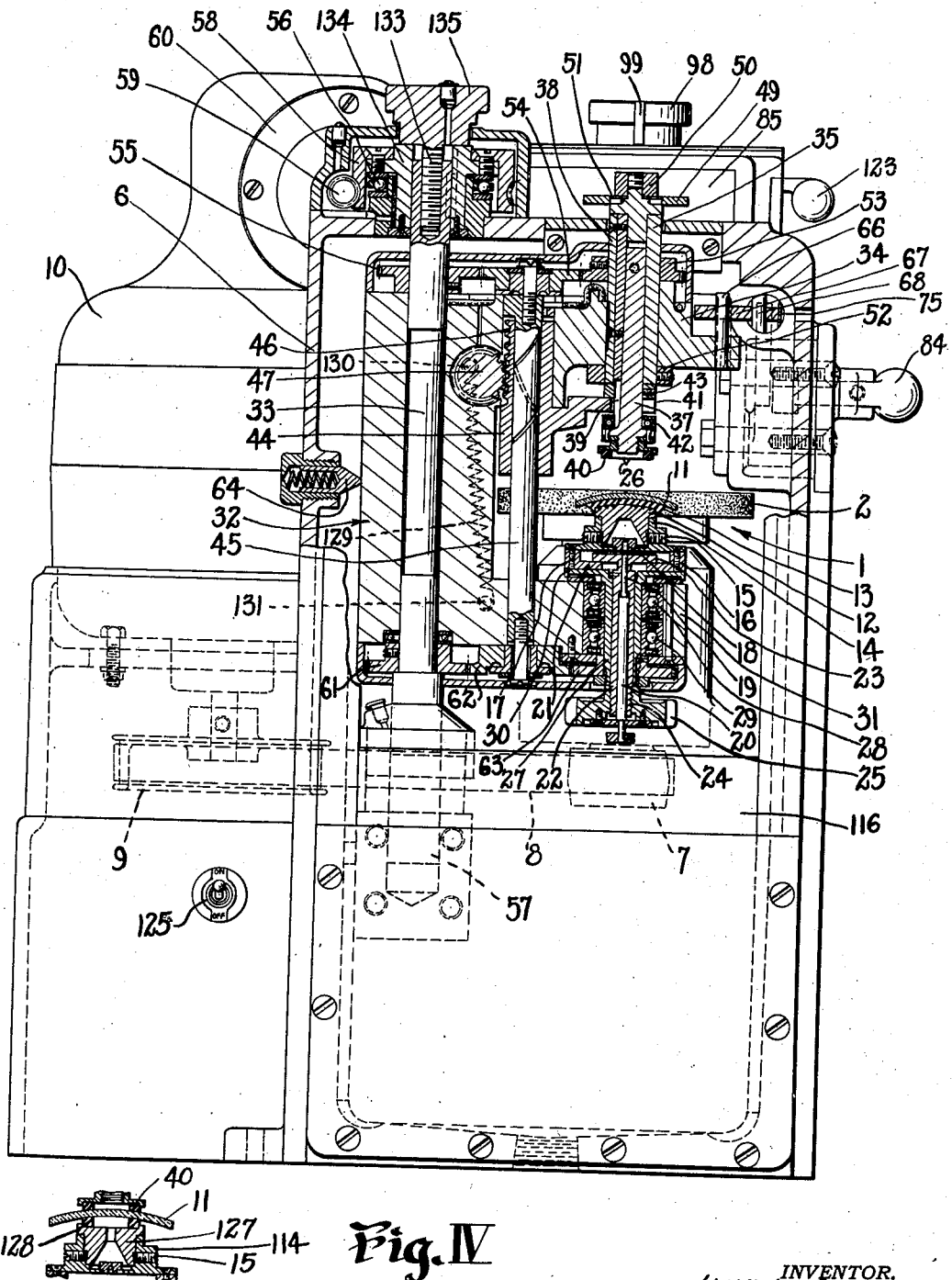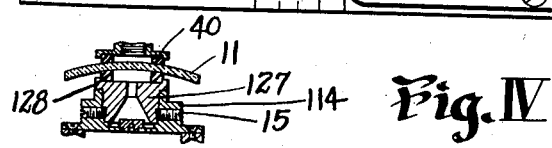

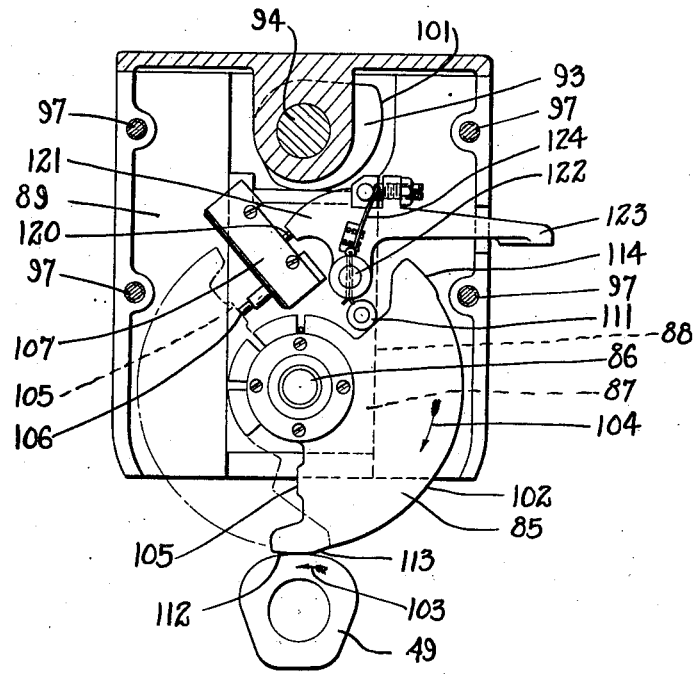
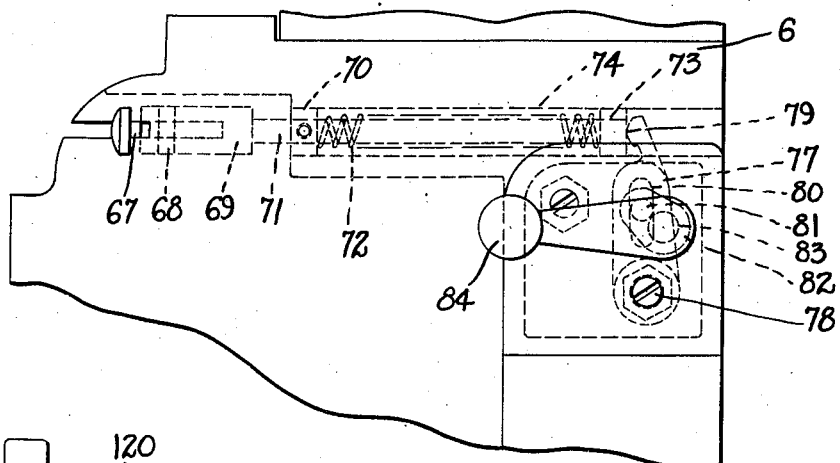
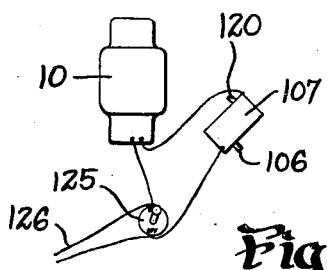

Patented Jan. 14, 1941

2,228,563

UNITED STATES PATENT OFFICE 2,228,563

ABRADING MACHINE

Lloyd W. Goddu, Southbridge, and John H. Smith, Taunton, Mass., assignors to American Optical Company, Southbridge, Mass., a voluntary association of Massachusetts Application May 25, 1938, Serial No. 210,002

11 Claims. (Cl. 51—101)

This invention relates to improvements in abrading devices and has particular reference to novel means and methods of abrading glass articles.

One of the principal objects of the invention is to provide novel means and method of abrading glass articles, such as lenses, to a given contour shape whereby the time of abrasion is greatly reduced and the resultant size and shape of the glass articles or lenses are more positively controlled.

Another object of the invention is to provide a novel method of edging lenses whereby an uncut lens may be formed to the size and shape desired by one complete revolution of the lens in engagement with the abrading tool of the device and in a controlled path relative to said tool.

Another object is to provide a device of the character described with means whereby the work or lens may be accurately positioned and held in abrading relation with the abrading tool.

Another object is to provide a device of the character described wherein one complete revolution of the work or lens in a given path is positively controlled.

Another object is to provide a device of the character described with means for automatically stopping the operation of the machine when the work or lens is edged to the desired size and contour shape.

A further object is to provide automatic means for moving the work away from the abrading stone when the edging operation is completed.

A further object is to provide an arrangement whereby lenses may be placed in abrading relation with the edge abrading tool while held on a support by which the lens is held during the forming of the finished optical surface on one side thereof.

A still further object is to provide an arrangement whereby the work or lens to be edged may be transferred directly from a lens surfacing machine to the present device without removing the lens from a fixed lens holder.

A still further object is to provide a method of edging lenses wherein the edging operation is of a milling nature whereby the lens is first fed into the tool to a controlled depth and is then rotated one complete revolution in a controlled path relative to the tool to reduce the lens to the desired size and contour shape.

A still further object is to provide aligning means for accurately positioning the lens in the lens holding means of the device.

Other objects and advantages of the invention should become apparent from the following description taken in connection with the accompanying drawings and it will be apparent that many changes may be made in the details of construction, arrangement of parts, and method shown and described without departing from the spirit of the invention as expressed in the accompanying claims. It, therefore, is to be understood that the invention is not limited to the specific details of construction, arrangement of parts, and method shown and described, as the preferred form only has been given by way of illustration.

Referring to the drawings:

Fig. I is a front elevation of the device embodying the invention;

Fig. II is a plan view of the device illustrated in Fig. I;

Fig. III is a sectional view taken as on line III—III of Fig. II and looking in the direction indicated by the arrows;

Fig. IV is a sectional view taken as on line IV—IV of Fig. II and looking in the direction indicated by the arrows;

Fig. V is a fragmentary sectional view taken as on line V—V of Fig. III and looking in the direction indicated by the arrows;

Fig. VI is a fragmentary side elevation of the mechanism for holding the work in engagement with the abrading tool;

Fig. VII is a diagrammatic view of the motor switch control system; and

Fig. VIII is a fragmentary sectional view of a modified form of lens holder.

Devices for abrading glass articles or lenses to a desired size and contour shape are not new in the art.

It has been usual however, with most prior art devices of this nature, to first cut the article or lens to substantially the finished contour shape desired and then remove the remainder of the contour of the article or lens by abrasion to complete the sizing and shaping thereof. With most prior art arrangements the abrading tool was of such a nature as to require the work to be rotated slowly throughout a plurality of cycles of movement in engagement with the abrading tool so as to enable the abrading tool to reduce the lens or article to the desired size and contour shape. Such abrading operations, due to the slow abrading action of the abrading tools, required considerable time. Difficulty was also encountered, due to the soft and relatively quick wearing nature of such prior art abrading tools, in arriving at the desired finished size and contour shape. Special mechanism was required for compensating for the quick wearing nature of the abrading tools and also for truing the abrading surface of such tools.

Most prior art devices required the continual attention of the operator and also required continual and careful adjustment in order to accomplish the results desired.

It, therefore, is one of the primary objects of this invention to obviate the above difficulties by providing an abrading device for edging the contours of glass articles or lenses whereby the cutting operation required with most prior art machines of this nature is eliminated and the time required by and the inaccuracies resulting from such prior art devices are obviated.

Referring more particularly to the drawings wherein like characters of reference designate like parts throughout the several views, the device embodying the invention comprises an abrading tool 1 formed preferably of a body of metal or other suitable material of disc shape having its abrading surface 2 impregnated with a plurality of abrasive particles such as crushed diamonds, sapphires, particles of carborundum, or the like.

The abrading tool 1 is mounted on a shaft 3 rotatably supported in spaced bearings 4 carried by a shelf-like support 5 in the housing 6. The shaft 3 and tool 1 carried thereby is rotated by means of a pulley 7 connected by means of a belt 8 to a pulley 9 driven by a motor 10.

The work or lens 11 which is to be edged by the abrading tool 1, as shown in Fig. IV, is secured to a lens holder 12 of the type used in supporting lenses during the abrading of the surfaces thereof, and the lens is held thereon by means of a layer of pitch or other suitable adhesive 13. The holder 12 is of the conventional type used in connection with surfacing machines. The holder 12 has a shank portion fitting within a chuck-like member 14 and is secured therein by screws or the like 15. The chuck-like member 14 has a flange secured to an adjustable head 16 by screws or the like 17. The base of the chuck 14 has an indent 18 axially aligned therewith which is adapted to receive the end 19 of an aligning plunger 20. The adjustable head 16 has an internal recessed flange 21 through which a rod 22 having an enlarged head 23 thereon extends. The lower end 24 of the rod is threaded to receive a manually operable nut-like member 25 so that when the head 16 is adjusted to desired position, the said head may be securely clamped in said adjusting position by tightening the nut 25 to draw the head 23 into engagement with the internal flange 21 of the adjustable head 16.

It is to be understood that the above aligning, through the use of the plunger 20 and indent 18 is made use of only when a clamp pad such as shown in Fig. VIII is employed. Should it be desired to position the lens 11 a given amount off center to introduce base in, out, up or down prism in the finished lens, suitable aligning dots A would be placed on the surface of the lens by a separate device so that the desired off center position could be determined and indicated by the dots A. The blocked lens 11, having such aligning dots thereon, would be placed in the chuck-like member 14. The adjustable head 16, having the chuck 14 thereon, would be adjusted sidewise, or in a direction laterally of the longitudinal axis of the support, an amount sufficient to align the aligning dots A on the face of the lens with suitable aligning pins or the like 26. The pins 26 are carried by a rod-like support 37 which is adjustably mounted in axial alignment with the plunger 20. The pins 26 also provide means for locating the lens in proper axial position. After the lens 11 has been moved so that the aligning dots thereon are aligned with the aligning pins 26 the clamp nut 25 is tightened to draw the head 23 into clamping engagement with the internal flange 21. This positively holds the lens in desired position in the holding device of the machine. The rod 22 is concentrically supported in a hollow stand 27 which is mounted in spaced ball bearings 28 and 29. The hollow stud 27 in which the rod 22 is supported has a flanged top 30 on which the internal flange 21 is clamped by the head 23 so that the chuck 14 and adjustable head 16 rotate with said hollow stud 27 and flange 30 as a unit in the bearings 28 and 29. The bearings 28 and 29 are carried by a portion 31 of a swinging head 32 which is pivoted to the housing 6 of the machine by a shaft 33 carried by said housing.

The head 32 has a spaced main bearing member 34 thereon, in axial alignment with the portion 31, in which a hollow shaft 35 is rotatably supported. The shaft 35 has the rod-like support 37 adjustably mounted therein for movement toward and away from the lens 11. The rod-like support 37 is held against rotation in the hollow shaft 35 by means of a key 38 sliding in a suitable keyway 39 in the side of said rod-like support 37. The rod-like support 37 has a suitable bearing pad 40 thereon and also carries the aligning pins 26. The rod-like support 37 and bearing pad 40 are moved longitudinally of the hollow shaft 35 by means of a yoke 41 fitting between a suitable bearing member 42, secured to said rod-like support 37, and a collar 43, also secured to said support. The yoke 41 is attached to a sleeve 44 slidably supported on a suitable rod 45 attached to the swinging head 32. The sleeve 44 is provided with a toothed rack portion 46 which meshes with a gear member 47 rotatably supported in the swinging head 32 and operated by a lever 48.

The hollow shaft 35 has a suitable former 49 detachably secured thereto by means of a nut or the like 50. The former 49 is located in proper axial position by means of suitable aligning keys 51 fitting within suitable slots in the former 49. The aligning keys 51 and slots in the former 49 are in predetermined meridinal relation with the pins 26. This is to automatically position the former and pin 26 in proper meridinal relation. The hollow shaft 35 is held against longitudinal movement in the main bearing 34 by a suitable collar 52, secured thereto at one side of the main bearing 34, and a gear 53 secured thereto at the opposite side of the main bearing 34.

The gear 53 meshes with a suitable idler gear 54 mounted on one end of the rod 45 which in turn meshes with a gear 55 mounted on the pivot shaft 33.

The pivot shaft 33 is rotatably supported adjacent its opposite ends in suitable bearings 56 and 57 carried by the main housing 6. The pivot shaft 33 has a worm gear 58 secured thereto adjacent its upper end which meshes with a worm 59 driven through a suitable reduction gearing in the gear box 60 and by the motor 10.

The pivot shaft 33 is also provided adjacent its lower end with a gear 61 meshing with an idler gear 62 which in turn is connected with a gear 63 attached to the hollow stud support 27. When the gear 58 is rotated by means of the worm 59 the hollow shaft 35, having the former 49 thereon, and the hollow stud support 27 having the lens 11 attached thereto, are simultaneously rotated through the train of gears 53, 54, 55, 61, 62 and 63.

The swinging head 32 mounted on the pivot shaft 33 is adapted to be swung toward and away from the abrading surface 2 of the abrading tool 1. It is held in a position away from the tool by means of a spring-pressed plunger 64 which engages in a suitable opening 65 in the side of the bearing portion of the swinging head 32.

The main bearing 34 has a pin 66 secured to a projection thereon which, when the swinging head 32 is moved toward the abrading tool 1, is adapted, as shown in Figs. I, II, IV and VI, to engage with a latch member 67 pivotally connected at 68 to a member 69 which is slidably supported in a suitable bearing 70 in the side of the housing 6. Member 69 has a rod-like portion 71 slidably supported in the bearing 70. A suitable coil spring 72 is mounted on the rod-like portion 71 and is adapted to engage a collar 73 secured to the rod-like portion 71 adjacent one end thereof and is adapted to engage the side wall of the bearing 70 adjacent its opposite end. The collar 73 is slidably mounted in a hollow bore 74 in the side of the housing 6 and is constantly urged by the spring 72 together with the rod-like member 71 in a direction toward the abrading tool 1 and, through the latch connection 67 with the pin 66, is adapted to simultaneously urge the swinging head 32 toward said abrading tool.

The latch member 67 is held in engagement with the pin 66 by a blade spring or the like 75 carried by the member 69. The blade spring 75 engages a suitable flat surface 76 on the side of the latch member 67 and thereby holds the said latch member against rotation about the pivot 68 when the spring 72 functions as described above.

The rod-like member 71 having the latch 67 thereon may be held against the action of the spring 72 by means of a rock member 77 pivoted to the housing 6, as illustrated at 78, and having an end 79 bearing against the end of the rod-like member 71. The rock member 77 has a slot 80 therein in which is mounted a projection 81 carried by an eccentric member 82 also pivoted to the housing 6, as illustrated at 83. The eccentric member 82 is rotated by means of a hand lever 84 which has a portion extending outwardly of the housing 6. Rotation of the hand lever 84 causes the end 79 to move from or toward the end of the rod-like member 71 so that when moved in a direction toward the front of the machine the said end 79 will urge the rod-like member 71 forward and simultaneously move the swinging head in a direction away from the abrading tool. When moved in the opposite direction the end 79 is removed from engagement with the inner end of the rod-like member 71 to permit free functioning of the spring 72. The spring member 72 is adapted to urge the swinging head toward the abrading tool 1 to move the work or lens 11 into engagement with the abrading surface 2 of the tool and also simultaneously move the former 49 into engagement with a suitable contact shoe 85. The contact shoe 85, as illustrated in Fig. II, III and V, is in the form of a section of a disc pivoted at 86 to a slide block 87 slidably mounted in a slideway 88 formed in a plate 89 adjustably connected to a top 90 of the housing 6 by a clamp screw or like means 91. The block 87 is constantly urged by a spring member 92 into engagement with a cam member 93. The cam member 93 is secured to a stud 94 rotatably supported in a bearing 95 in the top plate 96 of the machine. The plate 96 is secured to the plate 89 by suitable screws or the like 97.

The stud 94 has a hand nut 98 connected thereto and by means of which the cam 93 may be adjusted. The hand nut 98 has an indicator 99 thereon which cooperates with a suitable size indicating dial 100. Adjustment of the hand nut 98 causes the cam member 93 to engage with the slide block 87 and causes the said block to move longitudinally of the slideway 88. This longitudinal movement adjusts the contact shoe 85 in a direction toward and away from the front of the machine and initially controls the position of the center of the lens relative to the abrading surface of the tool 1. This provides means for controlling the resultant size of the lens and is positively determined by moving the indicator 99 in alignment with the proper graduation on the scale 100. The cam 93 is so designed as to impart the desired movement to the slide block 87. This is accomplished by the riser 101 on the cam.

The plate 89 having the slideway 88 therein is adjustably supported on the top 90 so as to locate the contact shoe 85 in an initially adjusted position which is adapted to remain relatively fixed during the use of the machine.

The contact shoe 85 has an arcuate face 102 substantially concentric with the center of its pivot 86 and is of such a length as to permit at least a complete revolution of the former 49 when in engagement therewith. The contact shoe is rotated about its pivot 86 by the frictional engagement therewith of the former 49 so that when the said former 49 is rotated in the direction indicated by the arrow 103 the said contact shoe 85 will be simultaneously rotated in the direction indicated by the arrow 104. When the former 49 has completed one complete revolution or a cycle of movement sufficient to rotate the lens one complete revolution in engagement with the abrading tool, a contact face 105 thereon engages a plunger 106 which operates a suitable micro-switch 107, carried by the slide block 87, to shut off the current to the motor 10 and stop rotation thereof.

A coil spring 108 secured at one end thereof, as illustrated at 109, to the contact shoe 85 and at its opposite end 110 to the slide block 87 is adapted to move the contact shoe 85 in a direction opposite that indicated by the arrow 104 to return it to its initial set when the former 49 is moved out of engagement therewith. A suitable stop pin 111 limits said movement.

The end of the face of the contact shoe 85 first engaged by the former 49 at the start of the edging operation may be provided with a raised portion 112 which tapers gradually into the contour surface 102, as illustrated at 113, to feed the work or lens 11 gradually into the abrading tool 2. The opposite end of the face 102 is also provided with a tapered protrusion 114 for automatically moving the work or lens 11 away from the abrading surface 2 after the lens has completed one revolution in engagement with said abrading surface. The distance between the raised portion 112 and protrusion 114 circumferentially of the surface 102 is such as to permit at least one complete revolution of the former 49 when in engagement with said surface 102.

It is apparent that during the abrading operation, if the former 49 should be held away from the surface 102 of the contact shoe, as by failure of the abrading tool 1 to remove a sufficient amount of the edge of the lens in engagement therewith or by failure of the lens to reach a proper depth during said abrading, the said contact shoe will be urged by the resilient means 108 towards its initial set so that a complete revolution of the former 49 in engagement with said surface 102 will be guaranteed before the said contact shoe trips the switch 107 and shuts off the motor 10.

The front of the machine is provided with a slideway 115 in which a baffle plate 116 is slidably mounted and which may be moved upwardly to close the front of the machine. The baffle plate 116 is held in an upward position by means of a latch member 117 which engages a suitable slot 118 formed in the side of the plate 116. The latch member 117 is pivoted in alignment with the slot 115, as illustrated at 119. The baffle plate is adapted to prevent outward splashing of a suitable lubricant which is fed onto the work or lens 11 and abrading surface 2 and tool 1 during the abrading operation. The lubricant is fed onto the work or lens 11 through a pipe line 132 as shown dotted in Fig. III. This pipe line is connected with a suitable lubricant tank and pump not shown.

The switch 107 is provided with another plunger 120 which may be operated by a contact member 121 pivoted at 122 to the slide block 87 and which has a lever portion 123 projecting outwardly of the machine. The contact means 121 is normally urged in a direction away from the plunger 120 by a blade spring or the like 124. Rearward pressure on the lever 123 will cause the contact 121 to engage the plunger 120 and move the switch back to its intial set after it has been tripped by the plunger 106. This operation is performed after a new lens or piece of work 11 has been placed in the machine and causes the power connection to the motor 10 to impart motion to the abrading wheel and work supporting head.

The switch connection 107 to the motor 10 is illustrated in Fig. VII. It is to be noted that an auxiliary switch 125 is provided in the main line 126 to a suitable source of power for controlling the inlet power to said motor 10.

If it is desired to clamp the work or lens 11 in the swinging head 32 of the machine, the lens holder 12 may be replaced by a block 127 having a suitable bearing pad 128 thereon. The block 127 is clamped in the chuck 14 by the clamp screws or the like 15. The pad 40 cooperates with the pad 128 to clamp and hold the lens in position and is urged toward the pad 128 by means of a spring 129 connected at one end to a pin 130 which is eccentrically mounted on the gear 47 and at its opposite end to a pin 131 on the main bearing 31, see Figs. III and IV. When the pin 130 is to the left of the center of rotation of the gear 47, as shown in Fig. IV, it tends to hold the pad 40 upwardly, when to the right of the center of rotation of said gear it causes the said spring to hold the pad downwardly. This is due to its tendency, when in this latter position to rotate the gear in a direction whereby it causes the yoke 41 to move downwardly and likewise move the pad downwardly.

The pivot shaft 33 on which the swinging head 32 is supported is provided with an adjusting screw 133 by means of which it may be raised and lowered relative to its bearing contact block 134 to move the head 33 and lens or work 11 supported thereby relative to the abrading face 2 of the tool. The screw 133 is provided with a suitable hand nut 135 by which it may be operated.

The belt 8 is rendered taut by means of an idler roll 136 carried by a bell crank 137. The bell crank is pivoted at 138 to a suitable bracket on the inner surface of the housing 6 and is constantly urged toward the belt 8 by means of a coil spring or the like 139.

The operation of the machine is substantially as follows:

A former 49 of the desired contour shape is secured to the hollow shaft 35. The work or lens to be edged and having suitable aligning dots A on the outer face thereof is placed in aligning position between the clamp pads 40 and 128. When the lens or work 11 is on a lens holder, such as illustrated at 12, said holder is placed in the chuck 14. The lens is aligned by moving the adjustable head 16 to a position wherein the aligning dots on the face of the lens are aligned with the aligning pins 26. This accurately locates the center and axis of the lens in desired position. The clamp nut 25 is then operated to secure the lens in this position.

The head 32 having the lens 11 supported thereon is swung toward the rotating abrading tool to lock the latch 67 with the pin 66. It being understood that the head is now integral with the rod 71 and that the rod 71 is held outwardly by the rocker arm 77. The baffle plate 116 is then raised and locked in position by the latch 117. Motion is then imparted to the operating mechanism to rotate the lens and abrading tool 1 by pressing the lever 123 to close the switch 107, it being understood that the switch 125 is moved to a position wherein the main circuit is closed. The lever 84 is then operated to move the rocker member 77 clear of the inner end of the rod 71. The head is allowed to move inwardly under the action of the spring 72 towards the abrading surface 2 of the tool an amount controlled by the former 49, which amount is limited by the contact of the former 49 with the raised surface 112. The former 49, which is being rotated through its gear drive with the motor and through its frictional engagement with the contact shoe 85, causes the said contact shoe to rotate about in its pivot 86. This rotation of the contact shoe 85 by the former 49 continues until the lens has been rotated one complete cycle of movement when in engagement with the abrading surface 2 of the tool and thereby moves the lens in a guided path controlled by the contour shape of the former throughout said cycle of movement. At the completion of said cycle of movement the contact face 105 of the contact shoe 85 engages the plunger 106 of the switch 107 and cuts off the power to the motor 10. This action takes place simultaneously to the movement of the tapered raised portion 114 into engagement with the former 49 and thereby simultaneously moves the work or lens 11 away from the abrading tool. As previously stated above, the raised portion 112, which tapers as illustrated at 113 into the surface 102 of the contact shoe 85, gradually feeds the lens into its final position relative to the abrading tool, at which position the lens is rotated one complete cycle of movement.

It is to be understood that the contact shoe 85 has been adjusted by reference to the indicator 99 and scale 100 to control the resultant size to which the lens is to be edged.

Although it has been stated that the lens 11 is fed directly into the tool prior to the rotation thereof throughout one complete cycle of movement, it is to be understood that the said lens may be continually rotated throughout a plurality of cycles of movement until it has been reduced to the size and shape desired. The plurality of cycles of movement, of course, depend upon the abrading characteristics of the tool. If the abrading action is relatively slow, as has been usual in the past, the former 49 will be held clear of the contact shoe 85 by the engagement of the oversize lens with the tool, until a sufficient amount of the contour edge of the lens is removed by the abrading tool, during said plurality of cycles of movement, to allow the said former to engage the contact shoe. When in this position, due to the frictional engagement of the former with the contact shoe, the said contact shoe will be operated until one complete cycle of movement of the lens or work has been made with the said former in constant engagement with said contact shoe. This causes the contact shoe to move to a position whereby it will engage the plunger 106 of the switch and shut off the power. The abrading operation, as previously set forth above, is similar to that performed by a milling cutter, with the separate abrading particles with which the surface 2 of the abrading tool is impregnated, functioning as a gang cutter so that a large amount of the material of the lens may be simultaneously removed.

The abrading tool 1 may be made by forming a plurality of cuts in the face of the tool, pressing abrasive particles in said cuts and thereafter forcing the side walls of said cuts into engagement with said particles to hold them in position, or said abrading surface may be formed of a mixture of pulverized metal and particles of abrasive which are shaped to the desired surface shape of the tool and thereafter sintered to anchor the abrasive particles therein.

It is also to be understood that the material for supporting the abrasive particles may be hardened to resist wear, with the degree of hardness such that the wear of the material will substantially keep pace with the wear of the cutting edges of the abrasive particles.

The tool 1 is provided with a shank 140 having a tapered opening therein fitted onto a tapered end 141 of the shaft 3. A suitable baffle collar 142 is provided for shielding the bearings 4 against the entrance of abrasive particles.

Abrading tools 1 having the characteristics described above are exceptionally resistant to wear. It has been found from actual experience that hundreds of lenses may be edged with the face of the tool showing little, if any, indication of wear. This arrangement, therefore, provides means whereby the lenses may be edged to the accurate size indicated by the scale 100 and indicator means 99. Any wear which might result through the edging of many lenses or change in size of tool due to truing may be compensated for by the adjustment of the plate 89, carrying the contact shoe 85, and its associated mechanism relative to the top 90.

This adjustment may be accomplished by edging a lens to a known size or by placing a lens of a known size in the holder of the machine and in engagement with the abrading tool, setting the indicator 99 to said known size on the scale 100, loosening the set screw 91, moving the contact face 102 into engagement with the former 49 when the said lens is in engagement with the abrading face of the tool and then tightening the set screw.

The abrading operation with abrasive impregnated tools, such as disclosed herein, in very speedy and, due to the milling characteristic of such tool, the necessity of first cutting the lenses to approximate contour shape is eliminated. The above arrangement provides means whereby lenses may be edged in considerably less time than that required by most prior art devices of a similar nature, and whereby the lenses may be edged with a greater degree of accuracy.

The size of the particles of abrasive are such that the abraded surface on the edge of the lens is relatively smooth and fine in texture.

From the foregoing description it will be seen that simple, efficient and economical means and method have been provided for accomplishing all of the objects and advantages of the invention, particularly that by which a lens may be quickly and accurately edged to size, and which is simple and automatic in its operation.

Having described our invention, we claim:

1. In an abrading machine, a tool having separate particles of abrasive secured in the effective surface of the tool, means for supporting work in engagement with said tool, means for rotating said tool and work in opposite directions at different rates of speed, former means for controlling the path of movement of the work relative to the tool, contact means in engagement with said former means for controlling the resultant size of the work and being adapted to be rotated by said former means, means adapted to be engaged by said rotating contact means for stopping the rotation of said work and abrading tool when the work has been abraded to its desired finished contour shape and size and means for automatically moving the work from engagement with the abrading surface of the abrading tool.

2. In an abrading machine the combination of an abrading tool, a work holding member having spaced holding members, one of said holding members having aligning means thereon and the other being adjustable in a direction transversely of the longitudinal axis of said aligning means to position the work in desired relation in the holding means, a former for controlling the finished shape of the work, contact means engaged by said former for controlling the resultant size of the work and means adapted to be operated by the contact means for automatically stopping the abrading action of the machine when the work has been reduced to the contour shape and size desired.

3. Operating mechanism for use with an abrading machine of the character described comprising a former for controlling the shape of the work, a movable contact shoe adapted to be engaged by said former to control the resultant size of the work, the said contact shoe being adjustable by frictional engagement of said former therewith and through the rotation of said former, and means supported in the path of the moving contact shoe to be operated by said contact shoe to stop the operation of the machine and means for returning the contact shoe to its initial set when the former is disengaged therefrom.

4. A work forming machine comprising an abrading tool member and a work holding member supported for relative positioning movement toward and away from each other and for rotary movement of one relative to the other, a contact shoe device, a former device associated with one of said members for engaging said contact shoe and arranged to control the path of movement of work held by said work holding member relative to said tool member, means for normally urging the work holding member and tool member towards each other and for simultaneously normally urging the former and contact shoe towards each other and means correlated with one of said devices operable through the engagement and disengagement of the former with the contact shoe for limiting the work holding member and work to one complete cycle of movement of said work relative to the tool with said work being abraded to a predetermined finished depth, the said means for limiting the work holding member and work to one complete cycle of movement being adapted to be rendered inoperative through disengagement of the former with the contact shoe and being adapted to be rendered operative when the former engages said contact shoe.

5. A work forming machine comprising an abrading tool member and a work holding member supported for relative positioning movement toward and away from each other and for rotary movement of one relative to the other, a contact shoe, a former associated with one of said members for engaging said contact shoe and arranged to control the path of movement of work held by said work holding member relative to said tool member, means for normally urging the work holding member and tool member towards each other and for simultaneously normally urging the former and contact shoe toward each other and means correlated with said contact shoe operable through the engagement and disengagement of the former with said contact shoe for limiting the work holding member and work to one complete cycle of movement of said work relative to the tool with said work being abraded to a predetermined finished depth, the said means for limiting the work holding member and work to one complete cycle of movement being adapted to be rendered inoperative through disengagement of the former with the contact shoe and being adapted to be rendered operative when the former engages said contact shoe.

6. A work forming machine comprising a diamond charged abrading tool member and a work holding member supported for relative positioning movement toward and away from each other and for rotary movement of one relative to the other, a contact shoe, means for shifting the position of said contact shoe, a former associated with one of said members for engaging said contact shoe and arranged to control the path of movement of work held by said work holding member relative to said tool member, means for normally urging the work holding member and tool member towards each other and for simultaneously normally urging the former and contact shoe towards each other, means having a portion interconnected with said contact shoe operable through the engagement and disengagement of the former with the contact shoe for limiting the lens holding member and work to one complete cycle of movement of the work relative to the tool with said work being abraded to a predetermined finished depth, the said means for limiting the work holding member and work to one complete cycle of movement being adapted to be rendered inoperative through disengagement of the former with the contact shoe and being adapted to be rendered operative when the former engages said contact shoe.

7. A lens edging machine comprising a rotating abrading tool and a work holding member adapted to support a lens for movement toward and away from the abrading tool, a former carried by said work support, means for rotating said former and lens simultaneously, a contact shoe adapted to be engaged by said former by movement of the work holding member towards the abrading tool, said former and contact shoe functioning to control the path of movement of the lens relative to the tool, means for normally urging the work holding member and lens toward the tool and for simultaneously normally urging the former and contact shoe towards each other and means correlated with said contact shoe operable through the engagement and disengagement of the former with said contact shoe for limiting the work holding member and lens to one complete cycle of movement of said lens relative to said tool with said lens being abraded to a predetermined finished depth by said tool, the said means for limiting the work holding member and lens to one complete cycle of movement being adapted to be rendered inoperative through disengagement of the former with the contact shoe and being adapted to be rendered operative when the former engages said contact shoe.

8. A lens edging machine comprising an abrading tool rotatably supported on a vertical spindle for rotation substantially in a horizontal plane and a work holding member supported for swinging movement on a vertical spindle and adapted to hold the lens to be abraded in abrading relation with said abrading tool, a former carried by the lens holding means, means for rotating said former and lens simultaneously, a contact shoe positioned to be engaged by said former, said contact shoe and former being arranged to control the path of movement of the lens held by said work holding member relative to said tool, means for normally urging the work holding member and lens toward the tool and for simultaneously normally urging the former and contact shoe toward each other and means correlated with said contact shoe operable through the engagement and disengagement of the former with said contact shoe for limiting the work holding member and lens to one complete cycle of movement of said lens relative to said tool with the said lens being abraded to a predetermined finished depth by said tool, the said means for limiting the lens holding member and lens to one complete cycle of movement being adapted to be rendered inoperative through disengagement of the former with the contact shoe and being adapted to be rendered operative when the former engages said contact shoe.

9. A work forming machine comprising an abrading tool member and a work holding member supported for relative positioning movement toward and away from each other and for rotary movement of one relative to the other, a contact shoe device, a former device associated with one of said members for engaging said contact shoe and arranged to control the path of movement of work held by said work holding member relative to said tool member, means for normally urging the work holding member and tool member towards each other and for simultaneously normally urging the formed and contact shoe towards each other and means correlated with one of said devices operable through the engagement and disengagement of the former with the contact shoe for limiting the work holding member and work to one complete cycle of movement of said work relative to the tool with said work being abraded to a predetermined finished depth, the said means for limiting the work holding member and work to one complete cycle of movement being adapted to be rendered inoperative through disengagement of the former with the contact shoe and being adapted to be rendered operative when the former engages said contact shoe and means for automatically checking the abrading of said work at the completion of one cycle of movement thereof relative to said tool when the work is abraded to a predetermined finished depth.

10. A work forming machine comprising an abrading tool member and a work holding member supported for relative positioning movement toward and away from each other and for rotary movement of one relative to the other, a contact shoe, a former associated with one of said members for engaging said contact shoe and arranged to control the path of movement of work held by said work holding member relative to said tool member, means for normally urging the work holding member and tool member towards each other and for simultaneously normally urging the former and contact shoe toward each other and means correlated with said contact shoe operable through the engagement and disengagement of the former with said contact shoe for limiting the work holding member and work to one complete cycle of movement of said work relative to the tool with said work being abraded to a predetermined finished depth, the said means for limiting the working holding member and work to one complete cycle of movement being adapted to be rendered inoperative through disengagement of the former with the contact shoe and being adapted to be rendered operative when the former engages said contact shoe and means for moving the work out of engagement with the abrading tool at the completion of said complete cycle of movement.

11. In an abrading machine, a tool having separate particles of abrasive secured in the effective surface of the tool, means for supporting work in engagement with said tool, means for rotating said tool and work relative to each other to introduce an abrading action between the tool and work, former means controlling the path of movement of the work relative to the tool, contact means in engagement with said former means for controlling the resultant size of the work and being adapted to be rotated by said former means, means adapted to be engaged by said rotating contact means for stopping the rotation of said work and abrading tool when the work has been abraded to its desired finished contour shape and size and means for automatically moving the work from engagement with the abrading surface of the abrading tool.

LLOYD W. GODDU.
JOHN H. SMITH.